United States Patent [19]

Misawa et al.

[11] Patent Number: 4,840,715

[45] Date of Patent: Jun. 20, 1989

[54] ELECTRODEPOSITION COATING METHOD

[75] Inventors: Masayuki Misawa, Hiratsuka; Toshio Ogasawara, Kamakura; Masahiko Sagane, Fujisawa; Yasuyuki Hirata, Hatano; Masafumi Kume, Hiratsuka, all of Japan

[73] Assignee: Kansai Paint Co., Ltd., Hyogo, Japan

[21] Appl. No.: 229,754

[22] Filed: Aug. 8, 1988

Related U.S. Application Data

[63] Continuation of Ser. No. 938,983, Dec. 3, 1986, abandoned.

[30] Foreign Application Priority Data

Dec. 4, 1985 [JP] Japan ................... 60-272817

[51] Int. Cl.$^4$ .............................................. C25D 13/06
[52] U.S. Cl. .................... 204/181.1; 204/181.7
[58] Field of Search ............... 204/181.1, 181.4, 181.7

[56] References Cited

U.S. PATENT DOCUMENTS

| | | | |
|---|---|---|---|
| 3,408,278 | 10/1968 | Stoodley | 204/181.4 |
| 3,846,356 | 11/1974 | Hou et al. | 204/181.4 |
| 4,624,762 | 11/1986 | Abbey et al. | 204/181.7 |

FOREIGN PATENT DOCUMENTS

| | | | |
|---|---|---|---|
| 2065534 | 5/1977 | Japan | 204/181.1 |
| 4066946 | 5/1979 | Japan | 204/181.1 |

*Primary Examiner*—John F. Niebling
*Assistant Examiner*—Ben C. Hsing
*Attorney, Agent, or Firm*—Wenderoth, Lind & Ponack

[57] ABSTRACT

A method of electrodeposition coating, which comprises performing a first electrodeposition coating on an article as a cathode using (I) a cationic electrodeposition paint comprising (A) a resin and (B) at least one pigment, said pigment (B) containing at least 5% by weight of a pigment having an oil absorption of at least 100 and being incorporated so that the total oil absorption of the pigment (B) is in the range of 1,000 to 10,000 per 100 g of the resin (A), then while the resulting coated film is in the uncured state, performing a second electrodeposition coating on it using (II) an emulsion-type cationic electrodeposition coating paint comprising a resin (C) and a pigment (D) and having a minimum electrodeposition current density of not more than 0.7 mA/cm$^2$ and a degree of emulsification of at least 80% by weight, said pigment (D) having a lower total oil absorption than the total oil absorption of the pigment (B) in the cationic electrodeposition paint (I), and thereafter curing the applied films under heat to form a composite cured coated film.

10 Claims, No Drawings

ELECTRODEPOSITION COATING METHOD

This application is a continuation of now abandoned application Ser. No. 938,983 filed Dec. 3, 1986.

This invention relates to an electrodeposition coating method in which two different cationic electrodeposition paints are coated by two coating operations on a substrate to form a composite cured paint film having excellent corrosion resistance, particularly excellent corrosion resistance and filamentous corrosion resistance at an edge portion (end surface) of the article.

Electrodeposition coating has been widely used heretofore in the field of coating automobiles and electrical appliances and machinery because the throwing power of the electrodeposition paint to the substrate is better than that of an organic solvent-base paint in air spray coating or electrostatic spray coating and it is easier to obtain a coated film having a relatively uniform thickness. In recent years, cationic electrodeposition coating has superseded anionic electrodeposition coating in fields where corrosion resistance is important, for example in the coating of automotive bodies, because the former gives a coated film having excellent corrosion resistance.

At the edge portion of an article coated by cationic electrodeposition, the coated film cannot have the desired thickness because the resulting electrodeposited film flows during curing under heat. This leads to the defect that the covering of the edge portion is poor, and its corrosion resistance is reduced.

Attempts have been made to remove such a defect by using a corrosion-resistant steel sheet as the substrate, or by applying a so-called edge coat composed of a solvent-base paint having good corrosion resistance to the edge portion by means of a roller or a brush. Such attempts have not proved to be entirely satisfactory in respect of cost and productivity. Coating of an electrodeposition paint twice in layers was proposed as a method of improving the corrosion resistance of the edge portion of a substrate or the filamentous corrosion resistance of the electrodeposited film. For example, Japanese Patent Publication No. 7716/1985 filed by the present assignee proposed a method comprising coating an electrodeposition paint containing an electrically conductive powder and being capable of forming a coated film having a volume inherent resistivity of $1 \times 10^7$ to $1 \times 10^{13}$ ohms-cm to form a first layer and while the first layer is uncured, applying an electrodeposition paint to form a second layer. Since the electrodeposition paint for the first layer contains an electrically conductive powder, its operability in coating is poor, and the resulting coated film has coating unevenness or roughening. Hence, even when the electrodeposition paint for the second layer is applied onto the first layer, both the corrosion resistance of the coated article except its edge portion and the smoothness of the coated film are poor.

In an attempt to improve the corrosion resistance of the edge portion of a substrate, there was also proposed a method which comprises applying a first electrodeposition paint at a low voltage of 10 to 100 V for a period of as short as 0.5 to 2 seconds to form an electrodeposited film only at the edge portion, and then applying a second electrodeposition paint (see Japanese Laid-Open Patent Publication No. 195998/1986). According to this method, only the edge portion of the substrate is coated by the first electrodeposition coating, and the remaining part of the substrate is coated by the second electrodeposition coating, because it is usually difficult to form a smooth coated surface free from coating unevenness by applying two layers of electrodeposition paint. However, since the time spent for the first electrodeposition coating is as short as 0.5 to 2 seconds, it is extremely difficult to control the coating accurately, and the method is difficult to apply to a coating line where an article to be coated, such as an automobile body, is conveyed to an electrodeposition coating bath by a conveyor and then coated from the coating bath. Furthermore, since the article to be coated generally has a complex shape, it is difficult in practice to form a coated film only at the edge portion by one coating operation. In the first coating, a coated film is formed in the other part too, and the smoothness of the coated film after the second electrodeposition coating is poor.

The present inventors have made extensive investigations in order to solve the problems of the prior art described above, and to develop an electrodeposition coating method capable of giving a coated film having excellent film properties such as the excellent corrosion resistance and filamentous corrosion resistance of the edge portion of the substrate without impairing the condition of the coated film such as smoothness even by two coatings of electrodeposition paint. These investigations have now led to the discovery that the corrosion resistance of the edge portion of the substrate is mainly improved by applying a cationic electrodeposition paint comprising a pigment having an oil absorption (as defined hereinbelow) of at least 100 as an essential ingredient as a first layer, and then by applying an emulsion-type cationic electrodeposition paint having a specific minimum electrodeposition current density as a second layer on the first electrodeposited film in the uncured state, the reduction in the coated surface condition (particulary smoothness) of the other part of the substrate and the reduction in the smoothness or gloss of a top coat to be applied to the final electrodeposited film can be prevented, and consequently, a coated film having excellent corrosion resistance and filamentous corrosion resistance at the edge portion of the article and excellent surface smoothness can be formed.

Thus, according to this invention, there is provided a method of electrodeposition coating, which comprises performing a first electrodeposition coating on an article as a cathode using (I) a cationic electrodeposition paint comprising (A) a resin and (B) at least one pigment, said pigment (B) containing at least 5% by weight of a pigment having an oil absorption of at least 100 and being incorporated so that the total oil absorption of the pigment (B) is in the range of 1,000 to 10,000 per 100 g of the resin (A), then while the resulting coated film is in the uncured state, performing a second electrodeposition coating on it using (II) an emulsion-type cationic electrodeposition coating paint comprising a resin (C) and a pigment (D) and having a minimum electrodeposition current density of not more than 0.7 mA/cm$^2$ and a degree of emulsification of at least 80% by weight, said pigment (D) having a lower total oil absorption than the total oil absorption of the pigment (B) in the cationic electrodeposition paint (I), and thereafter curing the applied films under heat to form a composite cured coated film.

The cationic electrodeposition paints (I) and (II) to be coated for the first and the second time in the method of this invention contain resin binders normally used in electrodeposition paints as the resin binder components (A) and (C), respectively. They may, for example, be polyamine resins such as amine-added epoxy resins. Examples include (i) adducts formed between polyepoxides and primary mono- or polyamines, secondary momo- or polyamines or primary or secondary mixed polyamines (see, for example, U.S. Pat. No. 3,984,299), (ii) adducts formed between polyepoxides and secondary mono- or polyamines having a ketiminized primary amino group (see, for example, U.S. Pat. No. 4,017,438), and (iii) products obtained by etherification reaction between polyepoxides and hydroxy compounds having a ketiminized primary amino group (see, for example, Japanese Laid-Open Patent Publication No. 43013/1984).

Where the composite cured coated film formed by the method of this invention requires good weatherability, the resin binders (A) and/or (C) may be a combination of the amine-added epoxy resin and an acrylic resin containing amino groups or nonionic acrylic resin having excellent weatherability. The resin binder (A) and/or (C) may be only the acrylic resin containing an amino group.

The amine-added epoxy resins can be cured with polyisocyanate compounds blocked with alcohols to form electrodeposited films. Amine-added epoxy resins which can be cured without using blocked isocyanate compounds may also be used. Examples of such epoxy resins are a resin obtained by introducing a beta-hydroxyalkyl carbamate group into a polyepoxide substance (see, for example, Japanese Laid-Open Patent Publication No. 155470/1984 and U.S. Pat. No. 4,528,363), and resins of the type that can be cured by ester-interchange reaction (see, for example, Japanese Laid-Open Patent Publication No. 80436/1980).

A cationic aqueous dispersion containing such a resin binder as described above can be prepared usually by neutralizing the resin binder with a water-soluble organic acid such as formic acid, acetic acid or lactic acid. A cationic electrodeposition paint comprising the resulting aqueous dispersion as a main component further includes a pigment. The cationic electrodeposition paint (I) used in the first electrodeposition contains the pigment (B) containing at least 5% by weight, preferably 10 to 100% by weight, more preferably 20 to 95% by weight, of a pigment having an oil absorption (to be defined hereinbelow) of at least 100, preferably at least 150. The amount of the pigment (B) incorporated is such that its total oil absorption is 1,000 to 10,000, preferably 1,500 to 9,000, more preferably 3,000 to 7,000, per 100 g of the resin component.

Examples of the pigment having an oil absorption of at least 100 to be incorporated as an essential pigment component in the cationic electrodeposition paint (I) are silicon dioxide pigments such as anhydrous silicon dioxide and hydrous amorphous silicon dioxide and carbon pigments. The silicon dioxide pigments are preferred. When the carbon pigment is used alone as the pigment having an oil absorption of at least 100, its electrical conductivity slightly reduces the operability of the cationic electrodeposition paint (I) in coating. Preferably, therefore, it is used in combination with the silicon dioxide pigment. In this case, the weight ratio of the silicon dioxide pigment to the carbon pigment may be from 9:1 to 6:4, preferably from 8:2 to 7:3.

The silicon dioxide pigments having an oil absorption of at least 100 are commercially available, for example, under the tradenames "Aerosil 200" (oil absorption 143-183) made by Japan Aerosil Co., Ltd., and "Syloid 161" (oil absopriton 128-135), "Syloid 244" (oil absorption 270-330), "Syloid 308" (oil absorption 170-220), "Syloid 404" (oil absorption 170-230) and "Syloid 978" (oil absorption 180-230) made by Fuji Davison Co., Ltd. As the carbon pigment, furnace-type or channel-type carbon black (oil absorption usually 100-130) used as a black pigment, for example "Carbon BAG", a tradename of a product made by Columbian Carbon Co., Inc. may be used.

In combination with the above pigments having an oil absorption of at least 100, pigments usually employed in electrodeposition paints may be incorporated in the electrodeposition paint (I) used in this invention so long as the total oil absorption of the pigment components in the pigment (B) is within the range of 1,000 to 10,000 per 100 g of the resin (A). Examples of the other pigments are inorganic colored pigments such as red iron oxide and titanium white and extender pigments such as talc, clay and calcium carbonate.

The total oil absorption of the pigments in the present invention is determined by the following procedure using the Method of Testing Pigments in accordance with JIS K 5101-78.

First, the oil absorption of each pigment is determined as follows:

Ten milligrams of the sample, accurately weighed, is taken on parchment paper and transferred onto a ground glass plate. The amount of boiled linseed oil is calculated on the basis of the anticipated oil absorption of the sample, and boiled linseen oil in an amount about 90% of the calculated amount is taken to the tip of a steel spatula from a microburette, and immediately then, the boiled linseen oil and the sample of the ground glass plate are thoroughly kneaded by this spatula for about 5 minutes. Then, 1 or 2 drops of boiled linseed oil are dropped onto the spatula and the mixture is uniformly kneaded by the spatula. This operation of adding 1 or 2 drops of boiled linseen oil and kneading the entire mixture is repeated until the whole sample becomes a solid uniform paste-like mass (end point). The amount of the boiled linseed oil required up to the end point is read to the order of 0.01 ml.

The oil absorption is calculated in accordance with the following equation.

$$A = \frac{L}{S} \times 100$$

where
A: the oil absorption,
S: the mass (g) of the sample,
L: the amount (g) of the boiled linseed oil used.

The total oil absorption is obtained by multiplying the amounts (g) of the individual pigments by the oil absorptions of these pigments calculated from the above formula, and summing up the products.

If the amount of the pigment having an oil absorption of at least 100 in the pigment (B) incorporated in the cationic electrodeposition paint (I) for the first layer is less than 5% by weight, an electrodeposition paint for the second layer tends to become difficult to deposit on the first layer.

Furthermore, if the total oil absorption of the pigment (B) in the cationic electrodeposition paint (I) used in the first electrodeposition is less than 1,000, the covering of the edge portion of an article to be coated, as intended by this invention, is not sufficient. If, on the other hand, it exceeds 10,000, pigment flocculation is liable to occur and cause filter blockage by flocculated masses of pigment particles or changes in the coated surface (pitting, surface roughening, etc.).

Preferably, after the first electrodeposition coating is performed, the electrodeposited film is washed with water (shower washing or dipping). The water used for washing may be deionized water, or a filtrate obtained by ultrafiltration or pure water obtained by reverse osmosis. This washing further increases the corrosion resistance of the edge portion and gives an electrodeposited film substantially free from pinhole defects.

The cationic electrodeposition paint (II) used in the second electrodeposition comprises the resin (C) and the pigment (D), and has a minimum electrodeposition current density of not more than 0.7 mA/cm$^2$, preferably not more than 0.5 mA/cm$^2$, more preferably not more than 0.3 mA/cm$^2$ and a degree of emulsification of at least 80% by weight, preferably at least 85% by weight, more preferably at least 90% by weight. The total oil absorption of the pigment (D) is lower than that of the pigment (B) in the electrodeposition paint (I), and is preferably less than 1,000. Otherwise, the electrodeposition paint (II) may be of any desired composition.

The minimum electrodeposition density is measured by the following method.

A platinum plate having a surface area of 1 cm$^2$ with an insulated back is used as a counterelectrode with respect to the substrate. The platinum plate and the substrate are disposed in an electrodeposition coating bath so that they are spaced from each other by a distance of 15 cm and their surfaces face each other. A constant current was passed at 28° C. without agitation, and the time and the voltage recorded. The current density is varied with an increment of 0.05 mA/cm$^2$. The minimum electrodeposition current density is defined as the current density determined when an abrupt rise in voltage attributed to an increase in resistance by the electroposition of the paint occurs at 3 minutes or a little more than 3 minutes.

The degree of emulsification of the electrodeposition piant (II) denotes the index expressing the proportion (% by weight) of particles suspended in the electrodeposition paint, and is determined by the following procedure.

First, about 35 cc of a 15 to 20% by weight clear emulsion is taken into a cell and sealed up. It is centrifuged at 28,000 rpm for 60 minutes. The supernatant (2 cc) is taken by a pipette and dried at 120° C. for 1 hour. The amount of the nonvolatile matter, $N_1$ (%), is measured.

Then, the cell is turned upside down to allow the sueprnatant to flow away, and further maintained in this state to remove the supernatant layer. The remaining sedimented layer is homogenized by a glass rod. Then, 1.5 to 2.0 g of the homogenized sedimented layer is precisely weighed, and dried at 120° C. for 1 hour. The amount of the non-volatile matter, $N_2$ (%), is measured.

Then, about 2 cc of a clear emulsion is precisely weighed, and dried at 120° C. for 1 hour. The amount of the non-volatile matter, $N_o$ (%), is measured.

The degree of emulsification can be calculated in accordance with the following equation.

$$\text{Degree of emulsification (wt. \%)} = \frac{N_2(N_0 - N_1)}{N_0(N_2 - N_1)} \times 100$$

If the minimum electrodeposition current density of the cationic electrodeposition paint (II) exceeds 0.7 mA/cm$^2$, it is difficult to secure a film thickness that imparts surface smoothness.

Furthermore, if the degree of emulsification of the electrodeposition paint (II) is less than 80% by weight, the second electrodeposited film layer gets mixed with the first electrodeposited film layer, and both the corrosion resistance of the edge portion and the smoothness of the coated surface tend to be reduced.

Methods and apparatuses known per se which have been used in cationic electrodeposition coating may be used to perform electrodeposition coating of an article with the cationic electrodeposition coating paints (I) and (II) in accordance with the method of this invention. Desirably, the article is used as the cathode and a carbon plate, as the anode. There is no particular restriction on the electrodeposition coating conditions used. Generally, it is desirable to carry out the electrodeposition without agitation under the following conditions.

Bath temperature: 20° to 30 ° C.
Voltage: 100 to 400 V (preferably 200 to 300 V)
Current density: 0.01 to 3 A/dm$^2$
Time for passing current: 30 seconds to 10 minutes
Electrode area ratio (A/C): 6/1 to 1/6
Interelectrode distance: 10 to 100 cm.

Conveniently, the first electrodeposited film formed by using the method of this invention has a thickness (in the dried state) of 5 to 30 micrometers, preferably 10 to 25 micrometers; and the second electrodeposited film formed on the first layer has a thickness (in the dried state) of 5 to 70 micrometers, preferably 10 to 50 micrometers.

In order to form a composite coated film and secure good adhesion, it is necessary that the second electrodeposition coating should be carried out while the first electrodeposited layer is in the uncured state. The first electrodeposited layer may, however, be heated at 120° C. for about 10 minutes, or subjected to such heating as to remove moisture with hot air. It should be understood therefore that the term "in the uncured state" also includes "in the half-cured state".

The composite electrodeposited film formed on the substrate is washed, and then baked at about 150° to 180° C. The thickness of the composite coated film is the total thickness of the first electrodeposited layer and the second electrodeposited layer. From an economical standpoint, the thickness of the composite coated film is desirably 15 to 80 micrometers. As required, a top coat may be applied to the resulting composite elecrodeposited film.

When the first and second electrodeposition coatings are carried out in accordance with the method of this invention, the coated film applied by the second electrodeposition deposits on the surface of the first electrodeposited film to form a coated film as a multilayer composed of the first electrodeposited layer and the second electrodeposited layer. The first electrodeposited film containing the pigment having a high oil absorption covers the edge portion of the article, and the second electrodeposition achieves surface smoothness and uniform film formation. As a result, the resulting composite coated film has excellent corrosion resistance at the edge portion and is free from pinhole effects.

According to the electrodeposition coating method of this invention, the corrosion resistance of the edge portion of an article, which is not satisfactory in the prior art, is greatly improved and the smoothness of the coated surface becomes superior. Hence, the method of this invention can be applied to corrosion-resistant coating of a wide range of industrial materials and products, for example automobiles, electrical appliances and machinery, and prefabricated steel frames.

The following Examples and Comparative Examples illustrate the present invention more specifically. All parts and percentages in these examples are by weight.

EXAMPLE 1

A cationic electrodeposition paint (paint 1-A) (corresponding to Elecron No. 9000 made by Kansai Paint Co., Ltd.) having the following formulation containing a water-soluble epoxy polyamino resin was used as a first electrodeposition paint and applied to an SPC mild steel plate (see Table 1) under the conditions shown in Table 1.

The resulting coated film was washed with water, and while it was still uncured, a cationic electrodeposition paint (paint 1-B) was electrodeposited in the uncured film under the conditions shown in Table 1. The coated film was washed with water and then baked by an electric dryer at about 180° C. to form a composite cured coated film.

The composite film was tested, and the results are shown in Table 2.

| Component | Paint 1-A Amount (g) | Oil absorption X amount |
|---|---|---|
| Water-soluble epoxy-type polyamino resin (*1) [as solids] | 100 | — |
| Carbon black (*2) (oil absorption 40) | 3 | 120 |
| Graphite (oil absorption 40) | 5 | 200 |
| Purified clay (oil absorption 43) | 15 | 645 |
| Syloid (*3) (oil absorption 300) | 26 | 7,800 |
| Total | 149 | 8,765 |

Resin:pigment = 100:49
Total oil absorption: 8,765
(*1): A resin obtained by neutralizing an epoxy-type polyamino resin having a basicity value of 80 with acetic acid to a neutralization equivalent of 0.55 to make it water-soluble.
(*2): Carbon AGM, a tradename for a product of Asahi Carbon Co., Ltd.
(*3): Hydrous amorphous silicon dioxide pigment (oil absorption 300) (Syloid, a tradename for a product of Fuji Davison Co., Ltd.)

| Component | Paint 1-B Amount (g) | Oil absorption X amount |
|---|---|---|
| Water-soluble epoxy-type polyamino resin (*4) | 100 | — |
| Titanium dioxide (oil absorption 22) | 10 | 220 |
| Purified clay (oil absorption 43) | 7 | 301 |
| Carbon black (*2) (oil absorption 40) | 1 | 40 |
| Total | 128 | 561 |

(*4): A resin obtained by neutralizing an epoxy-type polyamino resin having a basicity value of 80 with acetic acid to a neutralization equivalent of 0.24 to make it water-dispersible. It showed a minimum electrodeposition current density of 0.50 mA/cm$^2$ and a degree of emulsification of 85% by weight.

TABLE 1

| Coating step | | Coating conditions |
|---|---|---|
| 1. Material to be coated | | SPC mild steel plate (0.8 × 150 × 70 mm) |
| 2. Surface treatment | | Bondelite #3004 (Nihon Parkerizing Co., Ltd.) |
| 3. Electrodeposition coating (first) | Electrodeposition (the electrodeposition coating bath was adjusted to a solids content of 20% with deionized water) | Voltage: 150–250 V<br>Current passing time: 2 minutes<br>Bath temperature: 28° C.<br>Film thickness: about 20 micrometers |
| | Washing with water | Sprayed with deionized water |
| 4. Electrodeposition coating (second) | Electrodeposition (the electrodeposition coating bath was adjusted to a solids content of 20% with deionized water) | Voltage: 250–350 V<br>Current passing time: 2 minutes<br>Bath temperature: 28° C.<br>Film thickness: 20 to 25 micrometers |
| | Washing with water | Sprayed with deionized water |
| 5. Baking | | At 180° C. for 30 minutes |

EXAMPLE 2

A cationic electrodeposition paint (paint 2-A) (corresponding to Elecron No. 9000 made by Kansai Paint Co., Ltd.) comprising a water-soluble epoxy-type polyamino resin was used as a first electrodeposition paint and applied under the conditions shown in Table 1. The electrodeposited film was washed with water, and while the coated film was still uncured, a cationic electrodeposition paint (paint 2-b) (corresponding to Elecron No. 9600 made by Kansai Paint Co., Ltd.) comprising an epoxy resin containing an acrylic resin was used as a second electrodeposition paint, and applied under the conditions shown in Table 1. The multilayer coated film was washed with water and then baked by an electric dryer at about 180° C. to form a composite cured coated film. The composite film was tested, and the results are shown in Table 2.

| Component | Paint 2-A Amount (g) | Oil absorption X amount |
|---|---|---|
| Water-soluble epoxy-type polyamino resin (*1) | 100 | — |
| Carbon black (*2) (oil absorption 40) | 3 | 120 |
| Purified clay (oil absorption 43) | 10 | 430 |
| Syloid (*3) (oil absorption 300) | 5 | 1,500 |

-continued

Paint 2-A

| Component | Amount (g) | Oil absorption X amount |
|---|---|---|
| Total | 118 | 2,050 |

Resin:pigment = 100:18
Total oil absorption: 2,050

Paint 2-B

| Component | Amount (g) | Oil absorption X amount |
|---|---|---|
| Water-soluble acrylic-modified epoxy resin (*5) | 100 | — |
| Titanium dioxide (oil absorption 22) | 10 | 220 |
| Purified clay (oil absorption 43) | 7 | 301 |
| Carbon black (*2) (oil absorption 40) | 3 | 120 |
| Total | 120 | 641 |

(*5): A resin obtained by neutralizing a water-soluble acrylic-modified epoxy resin having a basicity value of 45 with acetic acid to a neutralization equivalent of 0.2 to make it water-dispersible. It had a minimum electrodeposition current density of 0.20 mA/cm$^2$ and a degree of emulsification of 92% by weight.

EXAMPLE 3

A cationic electrodeposition paint (paint 3-A) (corresponding to Elecron No. 9000 made by Kansai Paint Co., Ltd.) comprising a water-soluble epoxy-type polyamide resin was used as a first electrodeposition paint, and applied under the conditions shown in Table 1. The electrodeposited film was washed with water, and while it was still uncured, the same cationic electrodeposition paint (paint 2-B) as used in Example 2 was applied under the conditions shown in Table 1. The resulting multilayer film was washed with water, and then backed at about 180° C. by an electric dryer to form a composite cured coated film. The coated film was tested, and the results are shown in Table 2.

Paint 3-A

| Component | Amount (g) | Oil absorption X amount |
|---|---|---|
| Water-soluble epoxy-type polyamino resin (*6) [as solids] | 100 | — |
| Carbon black (*2) (oil absorption 40) | 2 | 80 |
| Syloid (*3) (oil absorption 300) | 15 | 4,500 |
| Total | 117 | 4,580 |

Resin:pigment = 100:17
Total oil absorption: 4,580
(*6): A resin obtained by neutralizing an epoxy-type polyamino resin having a basicity value of 80 with formic acid to a neutralization equivalent of 0.55 to make it water-soluble.

EXAMPLE 4

A cationic electrodeposition paint (paint 4-A) (corresponding to Elecron 9400 made by Kansai Paint Co., Ltd.) comprising a water-soluble epoxy-type polyamino resin was used as a first electrodeposition paint and applied under the conditions shown in Table 1. The electrodeposited film was washed with water, and while it was still in the uncured state, a cationic electrodeposition paint (paint 4-B) was applied under the conditions shown in Table 1. The resulting multilayer coated film was washed with water, and then baked at about 180° C. by an electric dryer to form a composite cured coated film. The composite film was tested, and the results are shown in Table 2.

Paint 4-A

| Component | Amount (g) | Oil absorption X amount |
|---|---|---|
| Water-soluble epoxy-type polyamino resin (*7) [as solids] | 100 | — |
| Titanium dioxide (oil absorption 22) | 20 | 440 |
| Talc (oil absorption 43) | 5 | 215 |
| Purified clay (oil absorption 43) | 10 | 430 |
| Syloid (*3) (oil absorption 300) | 10 | 3,000 |
| Total | 145 | 4,085 |

Resin:pigment = 100:145
Total oil absorption: 4,085
(*6): A resin obtained by neutralizing an epoxy-type polyamino resin having a basicity value of 80 with hydroxyacetic acid to a neutralization equivalent of 0.6 to make it water-soluble.

Paint 4-B

| Component | Amount (g) | Oil absorption X amount |
|---|---|---|
| Water-soluble epoxy-type polyamino resin (*8) | 100 | — |
| Titanium dioxide (oil absorption 22) | 20 | 440 |
| Carbon black (*2) (oil absorption 40) | 1 | 40 |
| Total | 121 | 480 |

(*8): A resin obtained by neutralizing an epoxy-type polyamino resin having a basicity value of 80 with hydroxyacetic acid to a neutralization equivalent of 0.15 to make it water-dispersible. It had a minimum electrodeposition current density of 0.29 mA/cm$^2$ and a degree of emulsification of 94% by weight.

COMPARATIVE EXAMPLE 1

The paint 1-B of Example 1 was electrodeposited first under the conditions shown in Table 1. The electrodeposited film was washed with water, and while it was still in the uncured state, the paint 1-B was applied for the second time. The resulting coated film was washed with water and baked. This coated film was tested, and the results are shown in Table 2.

COMPARATIVE EXAMPLE 2

Example 2 was repeated except that in the paint 2-A, 5 g of titanium dioxide (oil absorption 22) was used instead of 5 g of Syloid, and the total oil absorption of the pigment was changed to 555. The resulting composite cured coated film was tested, and the results are shown in Table 2.

COMPARATIVE EXAMPLE 3

Example 1 was repeated except that a cationic electrodeposition paint having a total oil absorption of 856 and the following formulation was used instead of the paint 1-A used in Example 1. The resulting composite cured coated film was tested, and the results are shown in Table 2.

| Component | Amount (g) | Oil absorption X amount |
|---|---|---|
| Water-soluble epoxy-type polyamino resin (*1) | 100 | — |
| Carbon black (*2) | 2 | 80 | coated film was tested, and the results are shown in Table 2.

TABLE 2

| | | Example 1 | Example 2 | Example 3 | Example 4 |
|---|---|---|---|---|---|
| Film thickness (micrometers) | 1st layer | 20 | 17 | 21 | 21 |
| | 2nd layer | 22 | 21 | 22 | 20 |
| Condition of the film | | good | good | good | good |
| Filamentous corrosion resistance | 240 hrs | no change | no change | no change | no change |
| | 480 hrs | no change | no change | no change | no change |
| | 720 hrs | no change | no change | no change | no change |
| Corrosion resistance of the 45° edge portion | 240 hrs | no change | no change | no change | no change |
| | 480 hrs | no change | no change | no change | no change |
| | 720 hrs | no change | some corrosion | no change | no change |
| Corrosion resistance of the general portion | 1000 hrs | no change | some corrosion | no change | no change |
| | 2000 hrs | no change | some corrosion | no change | no change |
| Accelerated weatherability | 100 hrs | good | excellent | good | good |

| | | Comparative Example 1 | Comparative Example 2 | Comparative Example 3 | Comparative Example 4 |
|---|---|---|---|---|---|
| Film thickness (micrometers) | 1st layer | 21 | 21 | 20 | 20 |
| | 2nd layer | 24 | 22 | 22 | 3 |
| Condition of the film | | good | good | good | Surface rough (poor) |
| Filamentous corrosion resistance | 240 hrs | some filamentous corrosion | some filamentous corrosion | some filamentous corrosion | no change |
| | 480 hrs | filamentous corrosion (2-4 mm long) | filamentous corrosion (2-3 mm long) | filamentous corrosion 2-3 mm long | no change |
| | 720 hrs | filamentous corrosion (4-10 mm long) | filamentous corrosion (3-9 mm long) | filamentous corrosion (3-7 mm long) | no change |
| Corrosion resistance of the 45° edge portion | 240 hrs | some corrosion | some corrosion | no change | no change |
| | 480 hrs | corrosion in a considerable portion | corrosion in a considerable portion | some corrosion | no change |
| | 720 hrs | corrosion in the entire portion | corrosion in the entire portion | corrosion in a considerable portion | no change |
| Corrosion resistance of the general portion | 1000 hrs | no change | no change | no change | some pitting |
| | 2000 hrs | pitting and blister | pitting and blister | pitting and blister | pitting |
| Accelerated weatherability | 100 hrs | good | good | good | poor |

| Component | Amount (g) | Oil absorption X amount |
|---|---|---|
| (oil absorption 42) Titanium white | | |
| (oil absorption 22) Syloid (*3) | 8 | 176 |
| (oil absorption 300) | 2 | 600 |
| Total | 112 | 856 |

COMPARATIVE EXAMPLE 4

Example 3 was repeated except that an electrodeposition paint having a minimum electrodeposition current density of 0.9 mA/cm$^2$ and a degree of emulsification of 75% by weight and having the same formulation as in the paint 2-B used in Example 3 but containing a resin obtained by neutralizing an epoxy-type polyamino resin with acetic acid to a neutralization equivalent of 0.5 to make it water-soluble, instead of the resin component of the paint 2-B, was used to form the second electrodeposited film layer. The resulting composite cured coated film was tested, and the results are shown in Table 2.

[Testing Methods]

Filamentous corrosion resistance

The test was conducted substantially in accordance with the filamentous corrosion test described in ATM-D2803-69T. An X-shaped cut reaching the substrate was diagonally provided in a sample by using one-edge safety razor, and the sample was put in a salt spray testing device for 24 hours. After the sample was sprayed with salt, it was well washed with deionized water. Before the sample dried, it was put in a constant temperature-humidity chamber and maintained at a temperature of 50°±2° C. and a relative humidity of 85±2% for 720 hours. During the test, the occurrence of filamentous corrosion was checked at 240 hours and 480 hours. When a clear filamentous corrosion was observed, its length was measured.

Corrosion resistance of a 45° edge portion

An SPC mild steel plate was processed to an angle of 45° and surface-treated with Bondelite #3004. The steel plate was then subjected to electrodeposition coating as described hereinabove, and then to a salt spray test in accordance with JIS Z-2371. The test was continued for 720 hours at the longest. During the test, the occurrence of pitting corrosion was checked at 240 hours and 480 hours.

Corrosion resistance of the general portion

In accordance with the salt spray test stipulated in JIS Z-2371, a cut-free general portion of the coated film was examined for pitting and blister. This test was continued for 2,000 hours at the longest. The occurrence of pitting and blister was checked at 1,000 hours during the test.

Accelerated weatherability

The sample was tested for 100 hours by a Sunshine Weater-Ometer, and the glass (60° specular gloss) of the coated film was examined. The gloss retention (%) is calculated by the following equation.

$$\text{Gloss retention (\%)} = \frac{\text{Gloss after testing}}{\text{Gloss in the initial stage}} \times 100$$

Excellent: The gloss retention is at least 80%
Good: The gloss retention is 50 to less than 80%
Fair: The gloss retention is 20 to less than 50%
Poor: The gloss retention is less than 20%

What is claimed is:

1. A method of electrodeposition coating, which comprises performing a first electrodeposition coating on an article as a cathode using (I) a cationic electroposition paint comprising (A) a polyamine resin and (B) at least one pigment, said pigment (B) containing at least 5% by weight of a pigment having an oil absorption of at least 100 and being incorporated so that the total oil absorption of the pigment (B) is in the range of 1,000 to 10,000 per 100 g of the resin (A), then while the resulting coated film is in the uncured state, performing a second electrodeposition coating on it using (II) an emulsion-type cationic electrodeposition coating paint comprising a resin (C) and a pigment (D) and having a minimum electrodeposition current density of not more than 0.7 mA/cm$^2$ and a degree of emulsification of at least 80% by weight, said pigment (D) having a lower total oil absorption than the total oil absorption of the pigment (B) in the cationic electrodeposition paint (I), and thereafter curing the applied films under heat to form a composite cured coated film.

2. The method of claim 1 wherein the pigment having an oil absorption of at least 100 is a silicon dioxide-type pigment or a carbon-type pigment.

3. The method of claim 1 wherein the pigment having an oil absorption of at least 100 is an anhydrous silicon dioxide pigment or a hydrous amorphous silicon dioxide pigment.

4. The method of claim 1 wherein the pigment (B) in the cationic electrodeposition paint (I) contains at least 10% by weight of a silicon dioxide pigment and has a total oil absorption of 3,000 to 7,000 per 100 g of the resin (A).

5. The method of claim 1 wherein the minimum electrodeposition current density of the cationic electrodeposition paint (II) is not more than 0.5 mA/cm$^2$.

6. The method of claim 1 wherein the cationic electrodeposition paint (II) has a degree of emulsification of at least 85% by weight.

7. The method of claim 1 wherein the total oil absorption of the pigment (D) in the cationic electrodeposition paint (II) is less than 1,000 per 100 g of the resin (C).

8. The method of claim 1 wherein the cationic electrodeposition paint (II) has a minimum electrodeposition current density of not more than 0.3 mA/cm$^2$ and a degree of emulsification of at least 90% by weight and the total oil absorption of the pigment (D) in the paint (II) is less than 1,000 per 100 g of the resin (C).

9. The method of claim 1 wherein each of the cationic electrodeposition paints (I) and (II) contains an amine-added epoxy resin as a resin binder component.

10. The method of claim 1 wherein the first and second electrodeposition coatings are carried out at a voltage of 100 to 400 V for 30 seconds to 10 minutes.

* * * * *